(12) United States Patent
Shimizu

(10) Patent No.: US 10,611,365 B2
(45) Date of Patent: Apr. 7, 2020

(54) HYBRID VEHICLE AND METHOD OF CONTROLLING THE SAME

(71) Applicant: TOYOTA JIDOSHA KABUSHIKI KAISHA, Toyota-shi, Aichi-ken (JP)

(72) Inventor: Yu Shimizu, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 211 days.

(21) Appl. No.: 15/943,179

(22) Filed: Apr. 2, 2018

(65) Prior Publication Data
US 2018/0297584 A1    Oct. 18, 2018

(30) Foreign Application Priority Data
Apr. 12, 2017   (JP) .................. 2017-078832

(51) Int. Cl.
| | | |
|---|---|---|
| *B60W 20/50* | (2016.01) | |
| *B60W 30/182* | (2020.01) | |

(Continued)

(52) U.S. Cl.
CPC ............ *B60W 20/50* (2013.01); *B60K 6/445* (2013.01); *B60W 10/06* (2013.01); *B60W 10/08* (2013.01);
(Continued)

(58) Field of Classification Search
CPC ...... B60W 20/50; B60W 10/06; B60W 10/08; B60W 10/105; B60W 30/182; B60W 2510/081; B60W 2520/10; B60W 2710/0666; B60W 2710/083; B60K 6/445; B60K 6/365; B60K 6/543; B60Y 2200/92; F16H 3/727; Y02T 10/623;
(Continued)

(56) References Cited

U.S. PATENT DOCUMENTS 9,393,957 B2 * 7/2016 Hoshiba ................ B60K 6/24
9,493,092 B2 * 11/2016 Kondoh ................ H02J 7/34
(Continued)

FOREIGN PATENT DOCUMENTS

| JP | 2013180647 A | * | 9/2013 |
| JP | 2013-203116 A | | 10/2013 |
| JP | 2017-081385 A | | 5/2017 |

OTHER PUBLICATIONS

Machine Translation of JP2013203116 (Year: 2013).*
Machine Translation of JP2013180647 (Year: 2013).*

*Primary Examiner* — Anne Marie Antonucci
*Assistant Examiner* — Sahar Motazedi
(74) *Attorney, Agent, or Firm* — Sughrue Mion, PLLC

(57) ABSTRACT

An electronic control unit of a hybrid vehicle controls an engine and an inverter to execute inverterless traveling. The inverterless traveling is a traveling state where the inverter is set to a gate blocking state, and where a reaction force of a torque that is output by a rotating electric device when the rotating electric device to be rotated by output of the engine generates electric power is applied to an output shaft. The electronic control unit controls a converter to adjust a voltage of an electric power line to a predetermined maximum voltage or a voltage within a predetermined range from the maximum voltage when a shift range of the hybrid vehicle is switched to a non-forward range from a forward range during the inverterless traveling.

6 Claims, 14 Drawing Sheets

(51) Int. Cl.
*B60K 6/445* (2007.10)
*B60W 10/08* (2006.01)
*B60W 10/105* (2012.01)
*B60W 10/06* (2006.01)
*F16H 3/72* (2006.01)
*B60K 6/543* (2007.10)
*B60K 6/365* (2007.10)

(52) U.S. Cl.
CPC ........ *B60W 10/105* (2013.01); *B60W 30/182* (2013.01); *B60K 6/365* (2013.01); *B60K 6/543* (2013.01); *B60W 2510/081* (2013.01); *B60W 2520/10* (2013.01); *B60W 2710/0666* (2013.01); *B60W 2710/083* (2013.01); *B60Y 2200/92* (2013.01); *F16H 3/727* (2013.01); *Y02T 10/623* (2013.01); *Y02T 10/6239* (2013.01); *Y02T 10/6243* (2013.01); *Y02T 10/6286* (2013.01); *Y10S 903/91* (2013.01); *Y10S 903/918* (2013.01); *Y10S 903/93* (2013.01); *Y10S 903/945* (2013.01)

(58) Field of Classification Search
CPC ............. Y02T 10/6239; Y02T 10/6243; Y02T 10/6286; Y10S 903/91; Y10S 903/918; Y10S 903/93; Y10S 903/945
See application file for complete search history.

(56) References Cited

U.S. PATENT DOCUMENTS

| | | | |
|---|---|---|---|
| 2001/0048226 A1* | 12/2001 | Nada | F02N 11/0859 290/40 C |
| 2008/0306643 A1* | 12/2008 | Hanyu | B60K 6/48 701/22 |
| 2009/0319109 A1* | 12/2009 | Ando | B60K 1/02 701/22 |
| 2011/0273122 A1* | 11/2011 | Murata | B62D 5/0484 318/400.22 |
| 2013/0173108 A1* | 7/2013 | Hashimoto | B60K 6/445 701/22 |
| 2014/0225430 A1* | 8/2014 | Oyobe | B60L 7/14 307/9.1 |
| 2014/0288756 A1* | 9/2014 | Tanaka | B60K 6/34 701/22 |
| 2017/0113680 A1 | 4/2017 | Shimizu et al. | |

* cited by examiner

HYBRID VEHICLE AND METHOD OF CONTROLLING THE SAME

INCORPORATION BY REFERENCE

The disclosure of Japanese Patent Application No. 2017-078832 filed on Apr. 12, 2017 including the specification, drawings and abstract is incorporated herein by reference in its entirety.

BACKGROUND

1. Technical Field

The present disclosure relates to a hybrid vehicle and a method of controlling the same and particularly, relates to a limp home mode of a hybrid vehicle in which an engine, a rotating electric device, and an output shaft are connected to each other through a planetary gear mechanism.

2. Description of Related Art

One aspect of a powertrain configuration of a hybrid vehicle disclosed in Japanese Unexamined Patent Application Publication No. 2013-203116 (JP 2013-203116 A) and the like is a configuration in which an engine and first and second electric motors are connected to each other with a planetary gear mechanism. The hybrid vehicle is configured to include an inverter that drives the first and second electric motors, and a converter that steps up an input voltage of the inverter to or above an output voltage of a battery.

In the hybrid vehicle, when a malfunction occurs in the inverter, a limp home mode in which the inverter is maintained in a gate blocking state is executed (hereinafter, the limp home mode will be referred to as "inverterless traveling", and a control for the limp home mode will be referred to as "inverterless traveling control"). Specifically, the first electric motor generates counter-electromotive force by mechanically (dynamically) rotating the first electric motor with the output of the engine in a state where each switching element of the inverter is maintained in an OFF state (gate blocking state). A traveling torque is secured by applying a torque (counter-torque) generated from the first electric motor to an output shaft (a ring gear of the planetary gear mechanism) through the planetary gear mechanism in a positive direction (forward) (refer to JP 2013-203116 A).

SUMMARY

For example, when a shift range is switched to a non-forward range (N range, P range, or the like) from a forward range (D range or the like) while a hybrid vehicle is stopped during an inverterless traveling control, it is considered that an engine may be stopped in order not to output a torque to an output shaft. However, since an inverter is in a gate blocking state during the inverterless traveling control, temporarily stopping the engine in the inverterless traveling control poses a problem in that the engine cannot be started up using the inverter and an electric motor, and that inverterless traveling cannot be performed.

Therefore, for example, when the shift range is switched to a non-forward range from a forward range during the inverterless traveling control, it is considered that generation of a counter-torque and a drive torque accompanied by the counter-torque in a first electric motor may be suppressed by setting a converter disposed between an electric power storage device and the inverter to a gate blocking state to block a flow of current to the electric power storage device from the first electric motor. However, when the shift range is switched to a non-forward range from a forward range, cutting the torque (counter-torque) generated by the first electric motor by immediately blocking the flow of current to the electric power storage device from the first electric motor may pose the following problem. That is, the rotational speed of the first electric motor may be rapidly increased by receiving the torque of the engine that is not decreased yet in accordance with the switching of the shift range, and an overvoltage of a system voltage (a voltage between the converter and the inverter) may be caused by a rapid increase in counter-voltage accompanied by the rapid increase in the rotational speed of the first electric motor.

The present disclosure provides a hybrid vehicle and a method of controlling the same that can continue inverterless traveling and suppress an overvoltage of a system voltage when a shift range is switched to a non-forward range from a forward range during an inverterless traveling control.

A first aspect of the present disclosure relates to a hybrid vehicle. The hybrid vehicle includes an engine, a rotating electric device, an output shaft, a planetary gear mechanism, an electric power storage device, a converter, an inverter, and an electronic control unit. The rotating electric device includes a rotor in which a permanent magnet is disposed. The output shaft is connected to drive wheels of the hybrid vehicle. The planetary gear mechanism mechanically connects the engine, the rotor of the rotating electric device, and the output shaft to each other. The planetary gear mechanism is configured to transmit a torque among the rotating electric device, the engine, and the output shaft. The electric power storage device is configured to be recharged. The converter is disposed between the electric power storage device and an electric power line. The converter is configured to adjust a voltage of the electric power line (system voltage) to or above a voltage of the electric power storage device. The inverter is connected between the electric power line and the rotating electric device. The inverter is configured to convert electric power between the electric power line and the rotating electric device. The electronic control unit is configured to control the engine and the inverter to execute inverterless traveling. The inverterless traveling is a traveling state where the inverter is set to a gate blocking state, and where a reaction force of a torque that is output by the rotating electric device when the rotating electric device to be rotated by output of the engine generates electric power is applied to the output shaft. The electronic control unit is configured to control the converter to adjust the voltage of the electric power line to a predetermined maximum voltage or a voltage within a predetermined range from the maximum voltage when a shift range of the hybrid vehicle is switched to a non-forward range from a forward range during the inverterless traveling.

A second aspect of the present disclosure relates to a method of controlling a hybrid vehicle. The hybrid vehicle includes an engine, a rotating electric device, an output shaft, a planetary gear mechanism, an electric power storage device, a converter, an inverter, and an electronic control unit. The rotating electric device includes a rotor in which a permanent magnet is disposed. The output shaft is connected to drive wheels of the hybrid vehicle. The planetary gear mechanism mechanically connects the engine, the rotor of the rotating electric device, and the output shaft to each other. The planetary gear mechanism is configured to transmit a torque among the rotating electric device, the engine, and the output shaft. The electric power storage device is configured to be recharged. The converter is disposed between the electric power storage device and an electric power line. The converter is configured to adjust a voltage of the electric power line (system voltage) to or above a voltage of the electric power storage device. The inverter is connected between the electric power line and the rotating electric device. The inverter is configured to convert electric power between the electric power line and the rotating electric device. The electronic control unit is configured to control the engine, the converter, and the inverter. The method includes executing inverterless traveling by the electronic control unit. The inverterless traveling is a traveling state where the inverter is set to a gate blocking state, and where a reaction force of a torque (counter-torque) that is output by the rotating electric device when the rotating electric device to be rotated by output of the engine generates electric power is applied to the output shaft. The method includes adjusting, by the electronic control unit, the voltage of the electric power line to a predetermined maximum voltage or a voltage within a predetermined range from the maximum voltage when a shift range of the hybrid vehicle is switched to a non-forward range from a forward range during execution of the inverterless traveling.

In the hybrid vehicle and the method of controlling the same, when the shift range is switched to a non-forward range from a forward range during the inverterless traveling, the converter is controlled to adjust the system voltage to the predetermined maximum voltage or the voltage within the predetermined range from the maximum voltage. Accordingly, a rotational speed of the rotating electric device is restricted to a rotational speed level at which a counter-voltage of the rotating electric device becomes equal to the maximum voltage level. Accordingly, when the shift range is switched to a non-forward range from a forward range during the inverterless traveling control, the hybrid vehicle and the method of controlling the same can continue the inverterless traveling and suppress an overvoltage of the system voltage.

In the hybrid vehicle according to the first aspect of the present disclosure, the electronic control unit may be configured to control the converter to be in the gate blocking state when a rotational speed of the rotating electric device is decreased below a predetermined rotational speed after the voltage of the electric power line is adjusted to the maximum voltage or the voltage within the predetermined range from the maximum voltage.

According to the first aspect of the present disclosure, the torque of the rotating electric device can be set to zero by setting the converter to the gate blocking state. An overvoltage of the system voltage does not occur since the converter is controlled to be in the gate blocking state after the rotational speed of the rotating electric device is decreased below the predetermined rotational speed.

For example, the predetermined rotational speed may be set based on the rotational speed of the rotating electric device at a time after a decrease in a torque of the engine caused by switching the shift range to a non-forward range from a forward range.

In the hybrid vehicle according to the first aspect of the present disclosure, the electronic control unit may be configured to control the converter to be in the gate blocking state when a predetermined time period elapses after the voltage of the electric power line is adjusted to the maximum voltage or the voltage within the predetermined range from the maximum voltage.

According to the first aspect of the present disclosure, an overvoltage of the system voltage can be suppressed with a simple configuration without acquiring the rotational speed of the rotating electric device.

The hybrid vehicle according to the first aspect of the present disclosure may further include a relay that is disposed between the electric power storage device and the converter. The electronic control unit may be configured to control the relay to be in an open state when a rotational speed of the rotating electric device is decreased below a predetermined rotational speed after the voltage of the electric power line is adjusted to the maximum voltage or the voltage within the predetermined range from the maximum voltage.

According to the first aspect of the present disclosure, the torque of the rotating electric device can be set to zero by controlling the relay to be in the open state. An overvoltage of the system voltage does not occur since the relay is controlled to be in the open state after the rotational speed of the rotating electric device is decreased below the predetermined rotational speed.

The hybrid vehicle according to the first aspect of the present disclosure may further include a relay that is disposed between the electric power storage device and the converter. The electronic control unit may be configured to control the relay to be in an open state when a predetermined time period elapses after the voltage of the electric power line is adjusted to the maximum voltage or the voltage within the predetermined range from the maximum voltage.

According to the first aspect of the present disclosure, an overvoltage of the system voltage can be suppressed with a simple configuration without acquiring the rotational speed of the rotating electric device.

According to the aspects of the present disclosure, when the shift range is switched to a non-forward range from a forward range during the inverterless traveling control, the inverterless traveling can be continued, and an overvoltage of the system voltage can be suppressed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
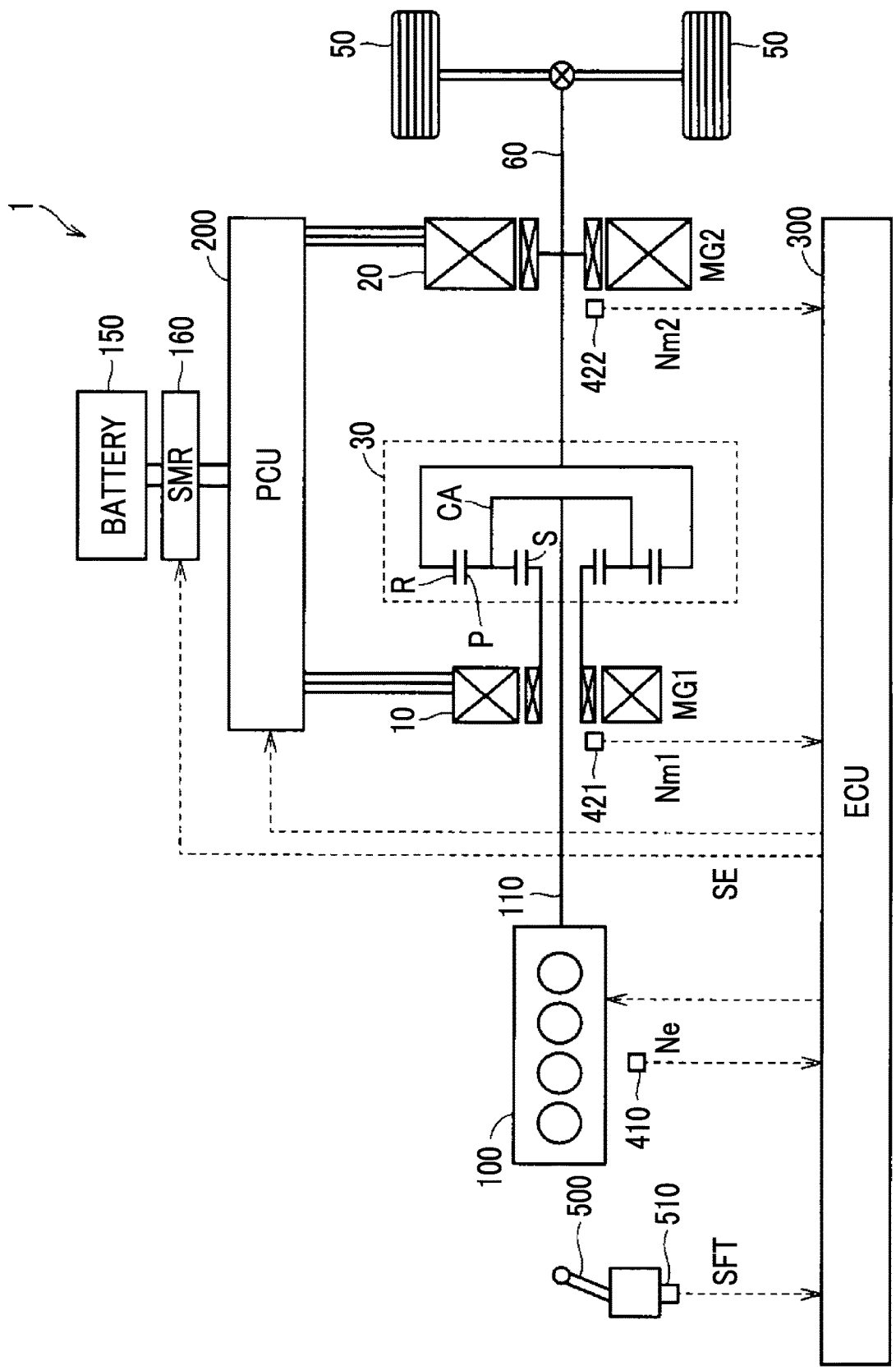
FIG. 1 is a block diagram schematically illustrating an overall configuration of a hybrid vehicle according to a first embodiment of the present disclosure.

Hereinafter, embodiments of the present disclosure will be described in detail with reference to the drawings. The same or corresponding parts in the drawings will be designated with the same reference signs, and descriptions of such parts will not be repeated.

First Embodiment

Overall Configuration of Hybrid Vehicle

FIG. 1 is a block diagram schematically illustrating an overall configuration of a hybrid vehicle according to a first embodiment of the present disclosure.

With reference to FIG. 1, a vehicle 1 includes an engine 100, motor generators 10, 20, a planetary gear mechanism 30, drive wheels 50, an output shaft 60 connected to the drive wheels 50, a battery 150, a system main relay (SMR) 160, a power control unit (PCU) 200, and an electronic control unit (ECU) 300.

The vehicle 1 travels using the power of at least one of the engine 100 and the motor generator 20. During normal traveling of the vehicle 1 described below, the traveling state of the vehicle 1 can be switched between electric vehicle traveling (EV traveling) and hybrid vehicle traveling (HV traveling). EV traveling does not use the power of the engine 100 and uses the power of the motor generator 20. HV traveling uses the power of both of the engine 100 and the motor generator 20.

The engine 100 is an internal combustion engine such as a gasoline engine or a diesel engine. The engine 100 generates power for traveling of the vehicle 1 in accordance with a control signal from the ECU 300. The power generated by the engine 100 is output to the planetary gear mechanism 30.

An engine rotational speed sensor 410 is disposed in the engine 100. The engine rotational speed sensor 410 detects a rotational speed Ne of the engine 100 and outputs a signal indicating the detection result of the rotational speed Ne to the ECU 300.

For example, each of the motor generators 10, 20 is a three-phase alternating current permanent magnet synchronous motor. The motor generator 10 (rotating electric device: MG1) rotates a crankshaft 110 of the engine 100 using the electric power of the battery 150 when the engine 100 is started up. The motor generator 10 can generate electric power using the power of the engine 100. Alternating current electric power generated by the motor generator 10 is converted into direct current electric power by the PCU 200 to charge the battery 150. The alternating current electric power generated by the motor generator 10 may be supplied to the motor generator 20.

A rotor of the motor generator 20 (rotating electric device: MG2) is mechanically connected to the output shaft 60. The motor generator 20 rotates the output shaft 60 using at least one of electric power supplied from the battery 150 and electric power generated by the motor generator 10. The motor generator 20 can generate electric power by regenerative braking. Alternating current electric power generated by the motor generator 20 is converted into direct current electric power by the PCU 200 to charge the battery 150. While the rotor of the motor generator 20 is directly connected to the output shaft 60 in the example in FIG. 1, the rotor may be mechanically connected to the output shaft 60 through a transmission (reduction gear).

A resolver 421 is disposed in the motor generator 10. The resolver 421 detects a rotational speed Nm1 of the motor generator 10 and outputs a signal indicating the detection result of the rotational speed Nm1 to the ECU 300. Similarly, a resolver 422 is disposed in the motor generator 20. The resolver 422 detects a rotational speed Nm2 of the motor generator 20 and outputs a signal indicating the detection result of the rotational speed Nm2 to the ECU 300.

The planetary gear mechanism 30 is configured to mechanically connect the engine 100, the motor generator 10, and the output shaft 60 with each other to transmit a torque among the engine 100, the motor generator 10, and the output shaft 60. Specifically, the planetary gear mechanism 30 includes a sun gear S, a ring gear R, a carrier CA, and a pinion gear P as rotating elements. The sun gear S is connected to a rotor of the motor generator 10. The ring gear R is connected to the output shaft 60. The pinion gear P meshes with the sun gear S and the ring gear R. The carrier CA is connected to the crankshaft 110 of the engine 100 and holds the pinion gear P such that the pinion gear P can rotate and revolve.

The battery 150 is illustrated as a representative example of an electric power storage device that is configured to be rechargeable. The battery 150 is representatively configured with a secondary battery such as a nickel-hydrogen secondary battery or a lithium ion secondary battery. A capacitor such as an electric double-layer capacitor can be used as the electric power storage device.

The SMR 160 is connected to an electric power line between the battery 150 and the PCU 200. The SMR 160 switches between a conduction state (ON) and a blocking state (OFF) between the battery 150 and the PCU 200 in accordance with a control signal SE from the ECU 300.

The PCU 200 steps up direct current electric power that is output from the battery 150. The PCU 200 converts the stepped-up voltage into an alternating current voltage and supplies the alternating current voltage to the motor generators 10, 20. The PCU 200 converts alternating current electric power generated by the motor generators 10, 20 into direct current electric power and supplies the direct current electric power to the battery 150. A detailed configuration of the PCU 200 will be described with FIG. 2.

The vehicle 1 further includes a shift lever 500 and a position sensor 510. The shift lever 500 is a device for allowing a user to select a shift range of the vehicle 1. When the user operates the shift lever 500, the position sensor 510 detects a position (shift position) SFT of the shift lever 500 and outputs a signal indicating the detection result of the shift position SFT to the ECU 300. The ECU 300 sets a shift range corresponding to the shift position SFT. Shift ranges include forward ranges such as drive (D) range and brake (B) range, and non-forward ranges such as parking (P) range, reverse (R) range, and neutral (N) range.

The ECU 300 is configured to include a central processing unit (CPU), a memory, input and output buffers, and the like (not illustrated). The ECU 300 controls each device to set the vehicle 1 to a desired traveling state based on maps and programs stored in the memory and signals from each sensor and device. Various controls can be processed not only using software but also using dedicated hardware (electronic circuit). While the ECU 300 is illustrated as a single element in FIG. 1, the ECU 300 may be disposed to be divided into a plurality of units per coherent function.

When there is a request to start up the engine 100 during a stoppage of the engine 100 (during a stoppage of fuel supply), the ECU 300 controls the PCU 200 (more specifically, an inverter 221 described below) such that the motor generator 10 generates a torque for cranking the engine 100. When the rotational speed Ne of the engine 100 reaches a predetermined rotational speed by cranking, a fuel injection control and an ignition control of the engine 100 are started. Accordingly, the engine 100 is started up.

Configuration of Electrical System

Figure 2:
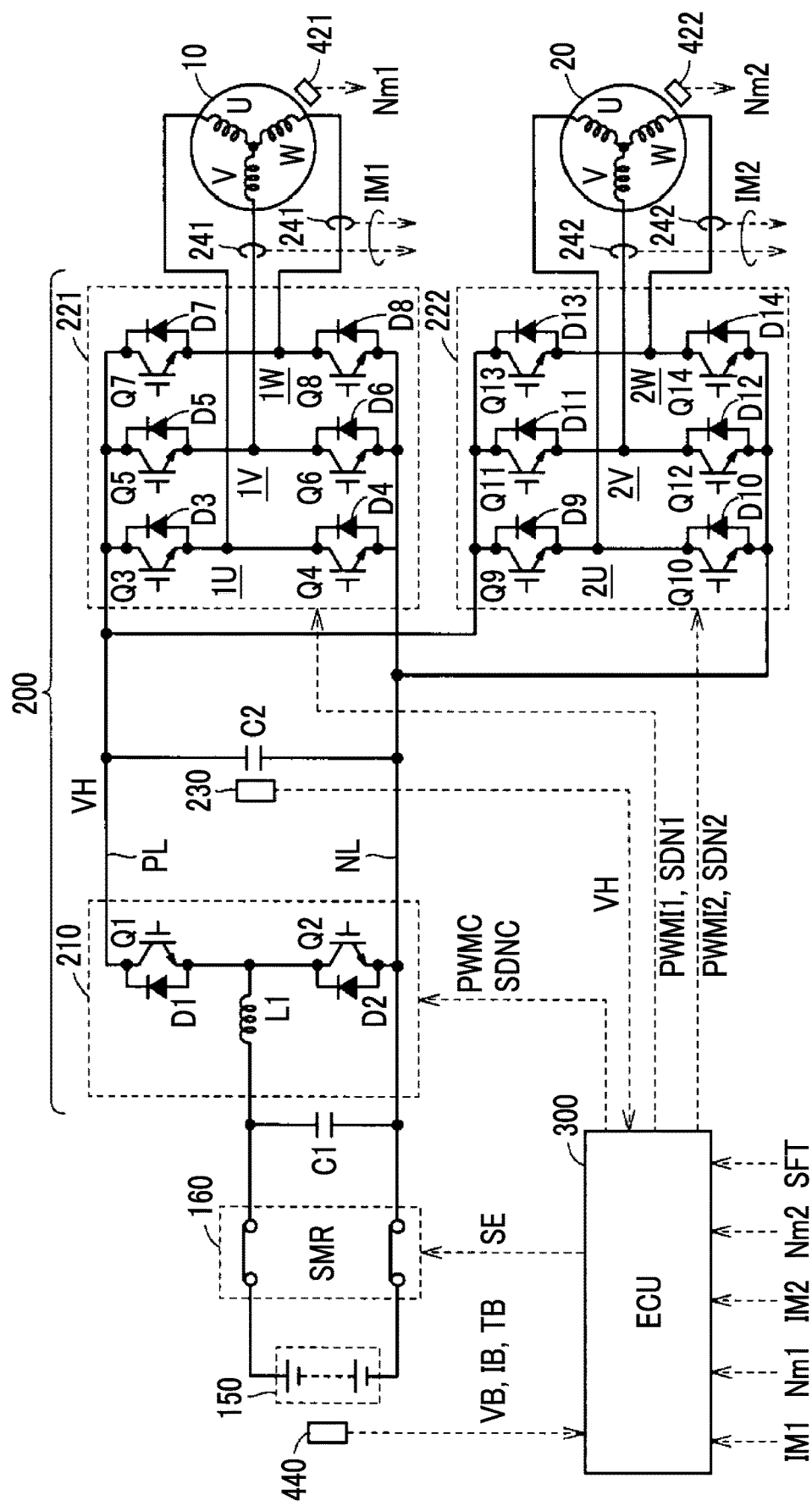
FIG. 2 is a circuit block diagram describing a configuration of an electrical system of the vehicle illustrated in FIG. 1.

FIG. 2 is a circuit block diagram describing a configuration of an electrical system of the vehicle 1. With reference to FIG. 2, a monitoring unit 440 is disposed in the battery 150. The monitoring unit 440 detects an output voltage (battery voltage) VB of the battery 150, an input/output current IB with respect to the battery 150, and a temperature TB of the battery 150. The monitoring unit 440 outputs signals indicating the detection results to the ECU 300.

The PCU 200 includes a capacitor C1, a converter 210, a capacitor C2, inverters 221, 222, a voltage sensor 230, and current sensors 241, 242. The capacitor C1 is connected in parallel to the battery 150. The capacitor C1 smooths voltage fluctuations on a lower voltage side (battery 150 side) of the converter 210.

The converter 210 is configured with a reversible current step-up chopper circuit and includes a reactor L1, switching elements Q1, Q2, and diodes D1, D2. For example, each of the switching elements Q1, Q2 and switching elements Q3 to Q14 of the inverters 221, 222 described below is an insulated gate bipolar transistor (IGBT). The switching elements Q1, Q2 are connected in series to each other between an electric power line PL and an electric power line NL. The diodes D1, D2 are connected in inverse-parallel to the switching elements Q1, Q2 respectively. A first end of the reactor L1 is connected to a high electric potential side of the battery 150. A second end of the reactor L1 is connected to a connection point between the switching element Q1 and the switching element Q2.

The converter 210 steps up a voltage (hereinafter, referred to as "system voltage") VH between the electric power lines PL, NL to or above the output voltage VB of the battery 150 in accordance with a pulse width modulation (PWM) control signal PWMC for a switching operation of each of the switching elements Q1, Q2. When the system voltage VH is lower than a target voltage VH*, the converter 210 steps up the electric power from the battery 150 and supplies the stepped-up electric power to the electric power line PL. When the system voltage VH is higher than the target voltage VH*, the converter 210 causes a current from the electric power line PL to flow to the battery 150. When the converter 210 receives a gate blocking signal SDNC from the ECU 300, the converter 210 sets each of the switching elements Q1, Q2 to a non-conduction state. Accordingly, the converter 210 is set to a gate blocking state.

The capacitor C2 is connected between the electric power line PL and the electric power line NL. The capacitor C2 smooths fluctuations in the voltage between the electric power line PL and the electric power line NL, that is, the system voltage VH. The voltage sensor 230 detects the voltage between both ends of the capacitor C2, that is, the system voltage VH, and outputs a signal indicating the detection result of the system voltage VH to the ECU 300.

The inverter 221 includes a U-phase arm 1U, a V-phase arm 1V, and a W-phase arm 1W. Each phase arm is connected in parallel to each other between the electric power lines PL, NL. The U-phase arm 1U includes the switching elements Q3, Q4 that are connected in series to each other. The V-phase arm 1V includes the switching elements Q5, Q6 that are connected in series to each other. The W-phase arm 1W includes the switching elements Q7, Q8 that are connected in series to each other. Diodes D3 to D8 are connected in inverse-parallel to the switching elements Q3 to Q8 respectively.

A middle point of each phase arm is connected to a coil corresponding to the motor generator 10. That is, a first end of a U-phase coil is connected to the middle point between the switching elements Q3, Q4. A first end of a V-phase coil is connected to the middle point between the switching elements Q5, Q6. A first end of a W-phase coil is connected to the middle point between the switching elements Q7, Q8. A second end of each phase coil is connected to each other to constitute a neutral point.

When the inverter 221 is supplied with the system voltage VH, the inverter 221 converts the direct current voltage into an alternating current voltage and drives the motor generator 10 in accordance with a PWM control signal PWMI for a switching operation of each of the switching elements Q3 to Q8. Accordingly, the motor generator 10 is driven to generate a torque that is specified by a torque instruction value. When the inverter 221 receives a gate blocking signal SDN1 from the ECU 300, the inverter 221 sets each of the switching elements Q3 to Q8 to a non-conduction state. Accordingly, the inverter 221 is set to a gate blocking state. A configuration of the inverter 222 is equivalent to the configuration of the inverter 221. Thus, a description of the configuration will not be repeated.

The current sensor 241 detects a current (hereinafter, referred to as "motor current") IM1 that flows in the motor generator 10. The current sensor 241 outputs a signal indicating the detection result of the motor current IM1 to the ECU 300. Hereinafter, a direction to the battery 150 from the motor generator 10 will be referred to as a positive direction of the motor current IM1. In the same manner as the current sensor 241, the current sensor 242 detects a motor current IM2 that flows in the motor generator 20. The current sensor 242 outputs a signal indicating the detection result of the motor current IM2 to the ECU 300.

Normal Traveling and Inverterless Traveling

The ECU 300 can cause the vehicle 1 to travel in any control mode of a normal mode and a limp home mode. The normal mode is a mode in which the vehicle 1 travels while switching between EV traveling and HV traveling when needed. In other words, the normal mode is a mode that allows the motor generators 10, 20 to be electrically driven using the inverters 221, 222. Hereinafter, traveling in the normal mode will be referred to as "normal traveling".

The limp home mode is applied when a malfunction occurs such that the motor generators 10, 20 cannot be normally electrically driven using the inverters 221, 222. In the limp home mode, the vehicle 1 travels by inverterless traveling as disclosed in JP 2013-203116 A. Representatively, when a malfunction occurs in components such as the current sensors 241, 242 that are needed for control performed by the inverters 221, 222, the vehicle 1 travels by driving the engine 100 with the inverters 221, 222 set to a gate blocking state. In other words, the limp home mode is a mode that prohibits the motor generators 10, 20 from being electrically driven using the inverters 221, 222.

Figure 3:
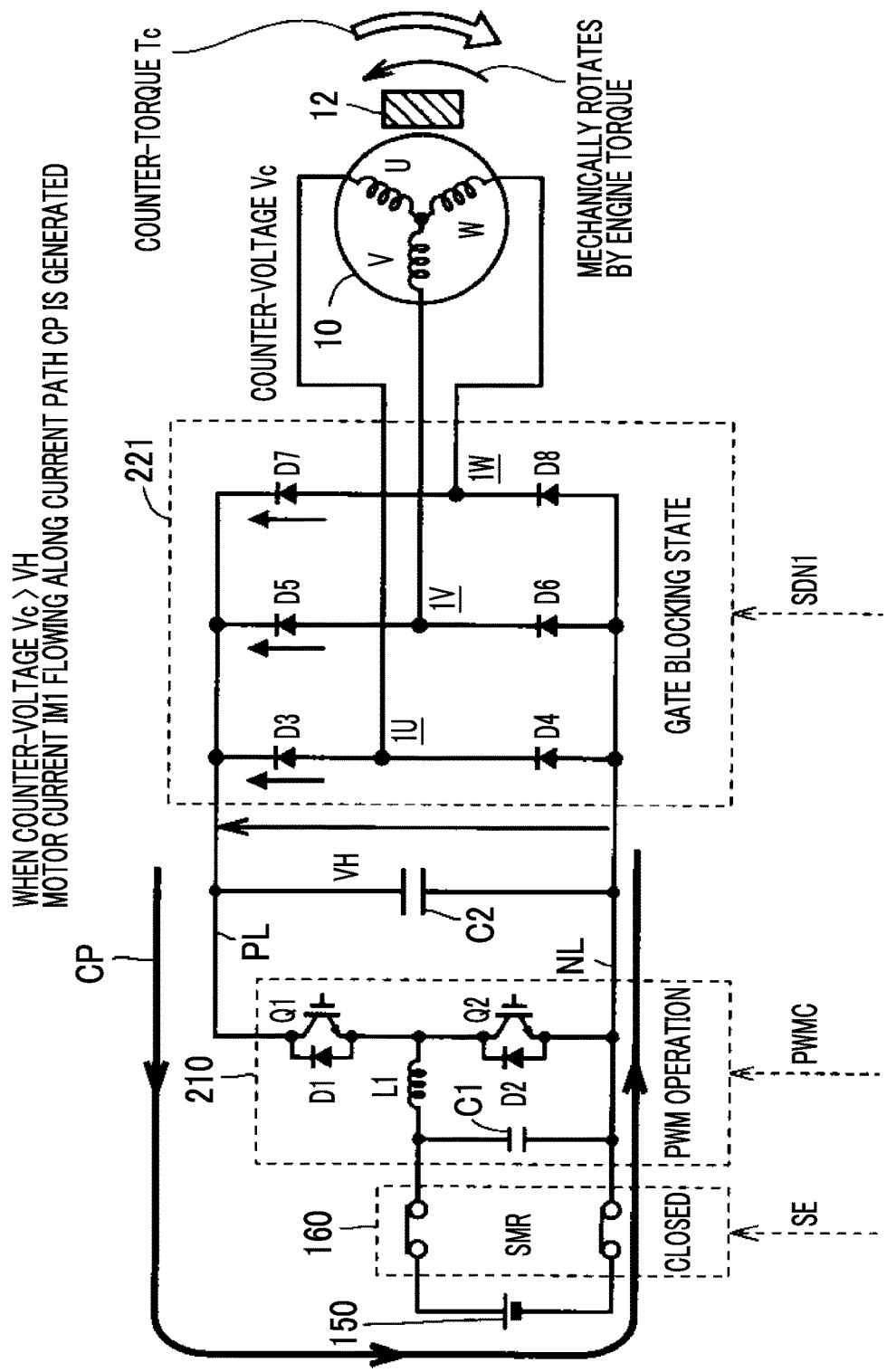
FIG. 3 is a diagram schematically illustrating a configuration of the electrical system during inverterless traveling.

FIG. 3 is a diagram schematically illustrating a configuration of the electrical system during inverterless traveling. With reference to FIG. 3, during inverterless traveling, all switching elements Q3 to Q8 included in the inverter 221 are set to a non-conduction state in response to the gate blocking signal SDN1. Thus, the diodes D3 to D8 included in the inverter 221 constitute a three-phase full-wave rectification circuit. Similarly, although not illustrated in FIG. 3, all switching elements Q9 to Q14 (FIG. 2) included in the inverter 222 are set to a non-conduction state in response to a gate blocking signal SDN2. Thus, diodes D9 to D14 included in the inverter 222 constitute a three-phase full-wave rectification circuit. A switching operation (PWM operation) of each of the switching elements Q1, Q2 continues in accordance with the control signal PWMC in the converter 210.

The engine 100 is driven during inverterless traveling. Thus, an engine torque Te is output from the engine 100. The engine torque Te mechanically (dynamically) rotates the motor generator 10. A permanent magnet 12 is disposed in the rotor of the motor generator 10. Thus, rotation of the permanent magnet 12 by the engine torque Te generates a counter-voltage Vc. When the counter-voltage Vc becomes higher than the system voltage VH, the diodes D3, D5, D7 are set to a conduction state. Accordingly, the motor current IM1 flows along a current path CP between the motor generator 10 and the battery 150, and the motor generator 10 generates electric power. At such a time, a torque (counter-torque Tc) that is applied in a direction of impeding rotation of the motor generator 10 is generated in the motor generator 10.

Figure 4:
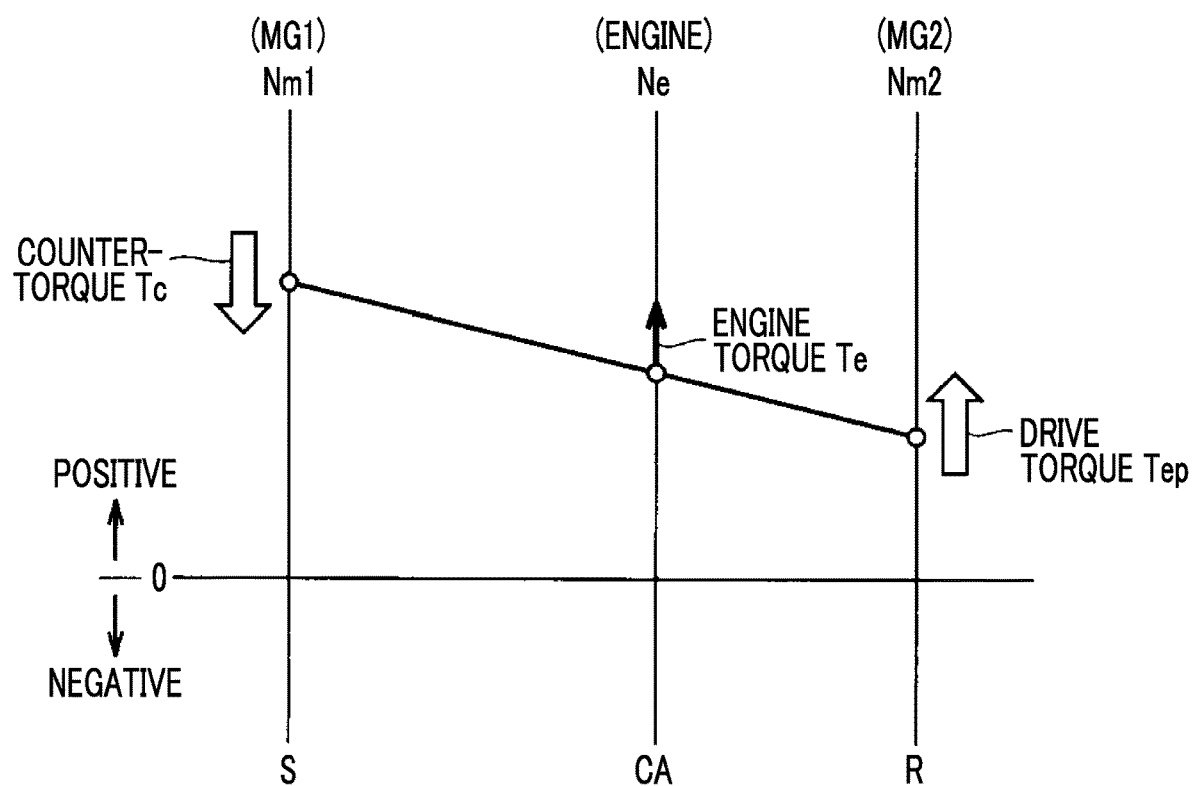
FIG. 4 is a collinear diagram for describing a behavior of each rotating element during inverterless traveling.

FIG. 4 is a collinear diagram for describing the behavior of each rotating element during inverterless traveling. With reference to FIG. 4, the configuration of the planetary gear mechanism 30 described with FIG. 1 results in a linear relationship on the collinear diagram among the rotational speed of the sun gear S (=rotational speed Nm1), the rotational speed of the carrier CA (=engine rotational speed Ne), and the rotational speed of the ring gear R (=rotational speed Nm2).

As described above, when the motor generator 10 is mechanically rotated by the engine torque Te during inverterless traveling, the motor generator 10 generates the counter-torque Tc in a direction of impeding rotation of the motor generator 10 (negative direction). When the counter-torque Tc is applied to the sun gear S from the motor generator 10, a drive torque Tep that is applied in a positive direction (forward direction) as a reaction force of the counter-torque Tc is generated in the ring gear R. Inverterless traveling of the vehicle 1 is realized with the drive torque Tep.

A relationship described below exists among the rotational speed Nm1, the system voltage VH, the counter-voltage Vc, the motor current IM1, and the counter-torque Tc of the motor generator 10.

Figure 5:
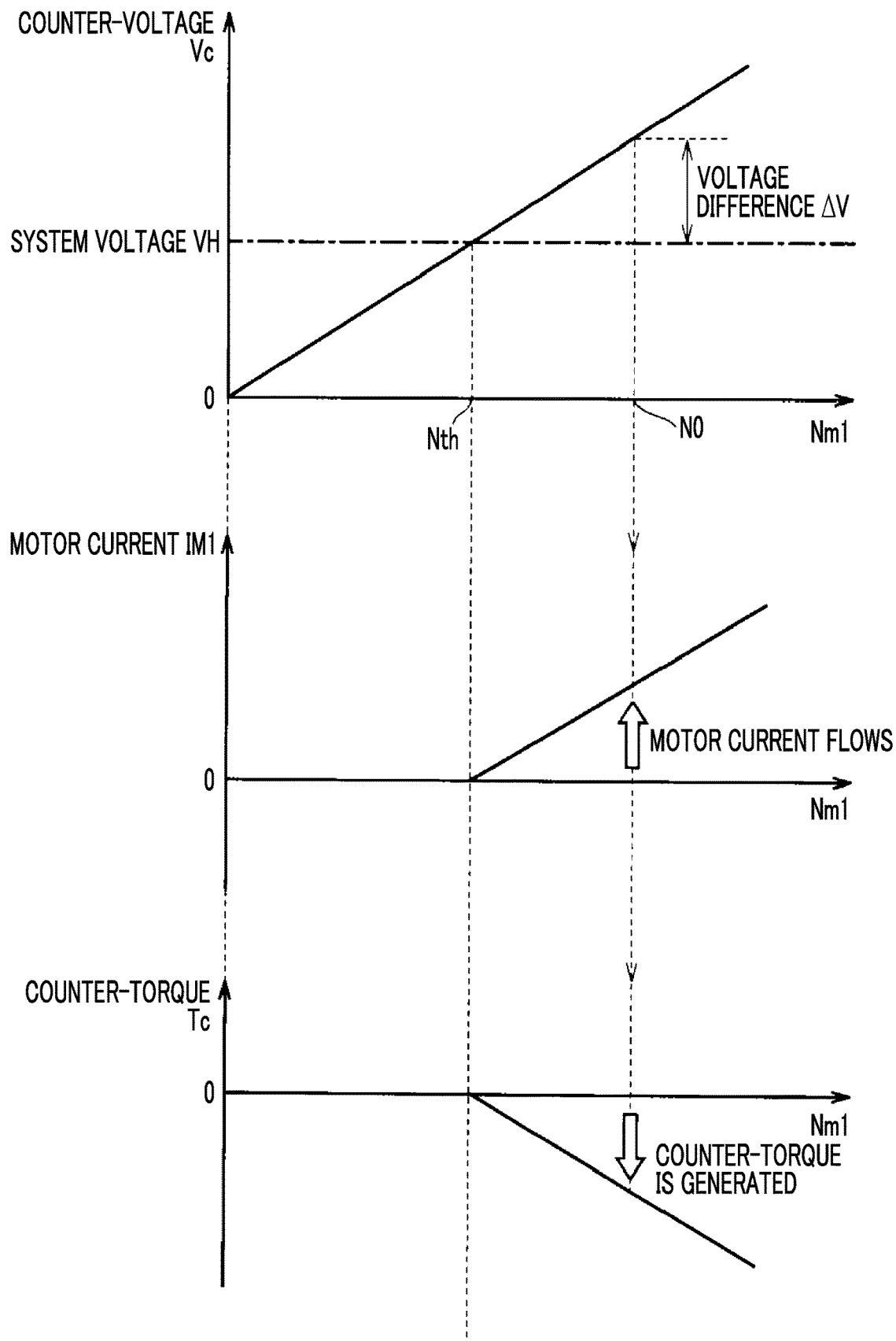
FIG. 5 is a graph for describing a relationship among a rotational speed of a motor generator, a system voltage, a counter-voltage, a current flowing in the motor generator, and a counter-torque.

FIG. 5 is a graph for describing the relationship among the rotational speed Nm1, the system voltage VH, the counter-voltage Vc, the motor current IM1, and the counter-torque Tc of the motor generator 10. In FIG. 5, a horizontal axis denotes the rotational speed Nm1 of the motor generator 10, and a vertical axis denotes, from the top, the counter-voltage Vc, the motor current IM1, and the counter-torque Tc of the motor generator 10.

With reference to FIG. 5, the counter-voltage Vc generated in the motor generator 10 has a characteristic of having a higher value as the rotational speed Nm1 is increased. The counter-voltage Vc is lower than the system voltage VH in a region where the rotational speed Nm1 is lower than Nth. That is, when the voltage difference between the counter-voltage Vc and the system voltage VH is denoted by ΔV (=Vc−VH), the voltage difference ΔV has a negative value. In such a case, since the diodes D3, D5, D7 are in a non-conduction state, the motor current IM1 does not flow along the current path CP to the battery 150 from the motor generator 10, and the motor generator 10 does not generate electric power. Thus, the counter-torque Tc is not generated.

The counter-voltage Vc is higher than the system voltage VH in a region where the rotational speed Nm1 is higher than Nth, and the voltage difference ΔV has a positive value. Thus, the diodes D3, D5, D7 are set to a conduction state, and the motor current IM1 flows along the current path CP. The motor current IM1 is increased as the voltage difference ΔV is increased. The counter-torque Tc is generated in the motor generator 10, and the drive torque Tep (FIG. 4) is generated as a reaction force of the counter-torque Tc.

For example, the following problem may arise when the shift range of the vehicle 1 is operated to be a non-forward range (P range, R range, or N range) while the vehicle 1 is temporarily stopped during an inverterless traveling control.

For example, when the shift range of the vehicle 1 is switched to a non-forward range from a forward range while the vehicle 1 is temporarily stopped during the inverterless traveling control, generation of the counter-torque Tc and the drive torque Tep accompanied by the counter-torque Tc can be suppressed by stopping the engine 100. However, since the inverter 221 is in a gate blocking state during the inverterless traveling control, when the engine 100 is temporarily stopped, the engine 100 cannot be started up again by cranking the engine 100 using the motor generator 10. Consequently, inverterless traveling cannot be continued.

As described above, when the shift range is switched to a non-forward range from a forward range during the inverterless traveling control, inverterless traveling needs to be continued by maintaining the engine 100 in a drive state and suppressing generation of the drive torque Tep caused by the counter-torque Tc which is a torque not needed.

Therefore, it is considered that when the shift range is switched to a non-forward range from a forward range during the inverterless traveling control, generation of the counter-torque Tc by the motor generator 10 may be suppressed by blocking the motor current IM1 flowing between the motor generator 10 and the battery 150 and maintaining the engine 100 in a drive state. Accordingly, generation of the counter-torque Tc and the drive torque Tep can be suppressed without stopping the engine 100, and inverterless traveling can be continued.

Figure 6:
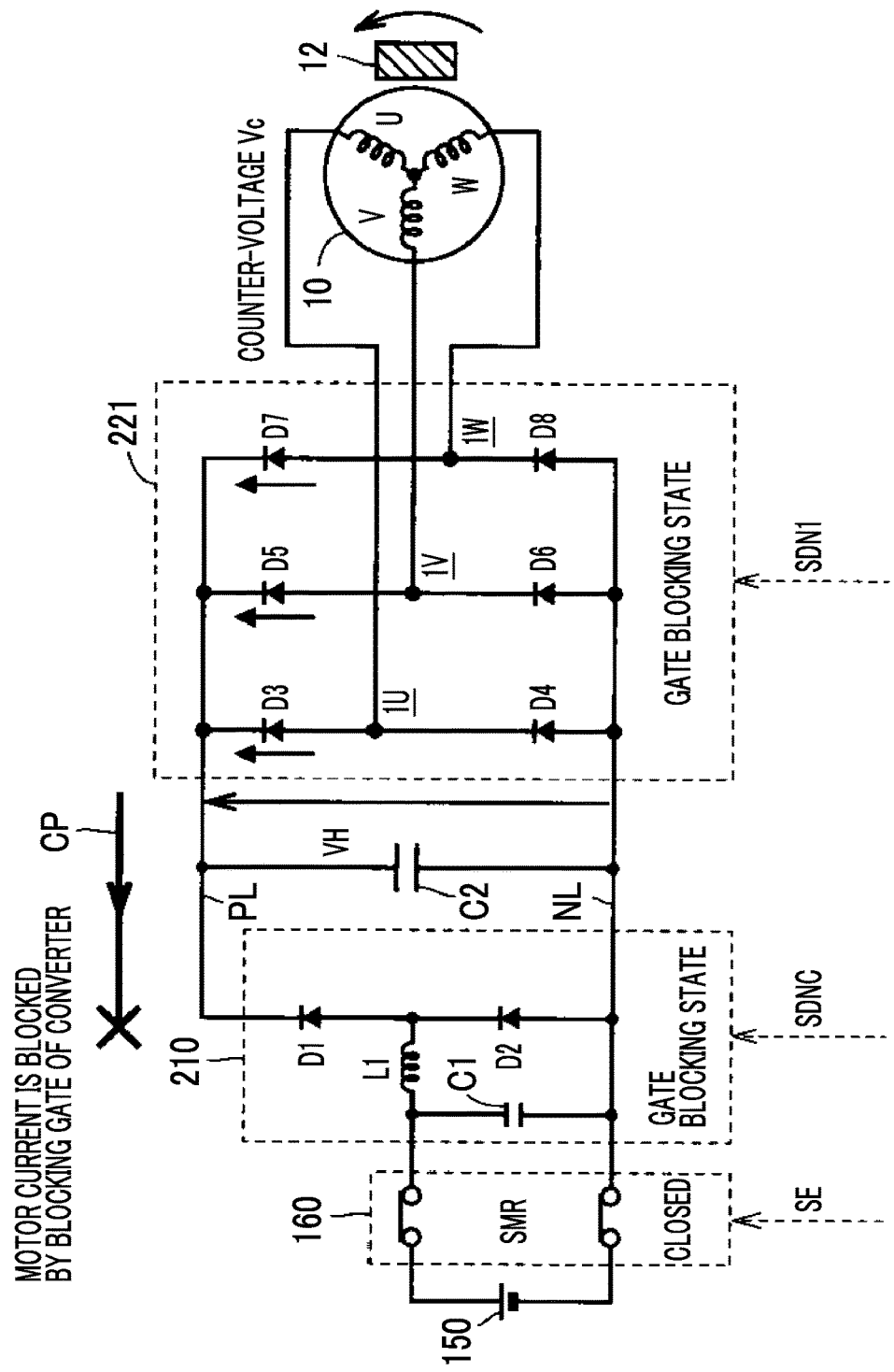
FIG. 6 is a diagram schematically illustrating a configuration of the electrical system when a current flowing along a current path is blocked during an inverterless traveling control.

FIG. 6 is a diagram schematically illustrating a configuration of the electrical system when the motor current IM1 flowing along the current path CP is blocked during the inverterless traveling control. With reference to FIG. 6, the motor current IM1 can be blocked by setting the converter 210 to a gate blocking state using the gate blocking signal SDNC. Since both of the inverter 221 (222) and the converter 210 are in a gate blocking state, currents do not flow in any of a direction to the battery 150 from the motor generator 10 (20) and a direction to the motor generator 10 (20) from the battery 150.

However, when the shift range is switched to a non-forward range from a forward range, cutting the counter-torque Tc generated by the motor generator 10 by immediately blocking the flow of current to the battery 150 from the motor generator 10 may pose the following problem. That is, the rotational speed Nm1 of the motor generator 10 may be rapidly increased by receiving the torque Te of the engine 100 that is not decreased yet in accordance with the switching of the shift range, and an overvoltage of the system voltage VH may be caused by a rapid increase in counter-voltage Vc accompanied by the rapid increase in the rotational speed Nm1 of the motor generator 10.

Figure 7:
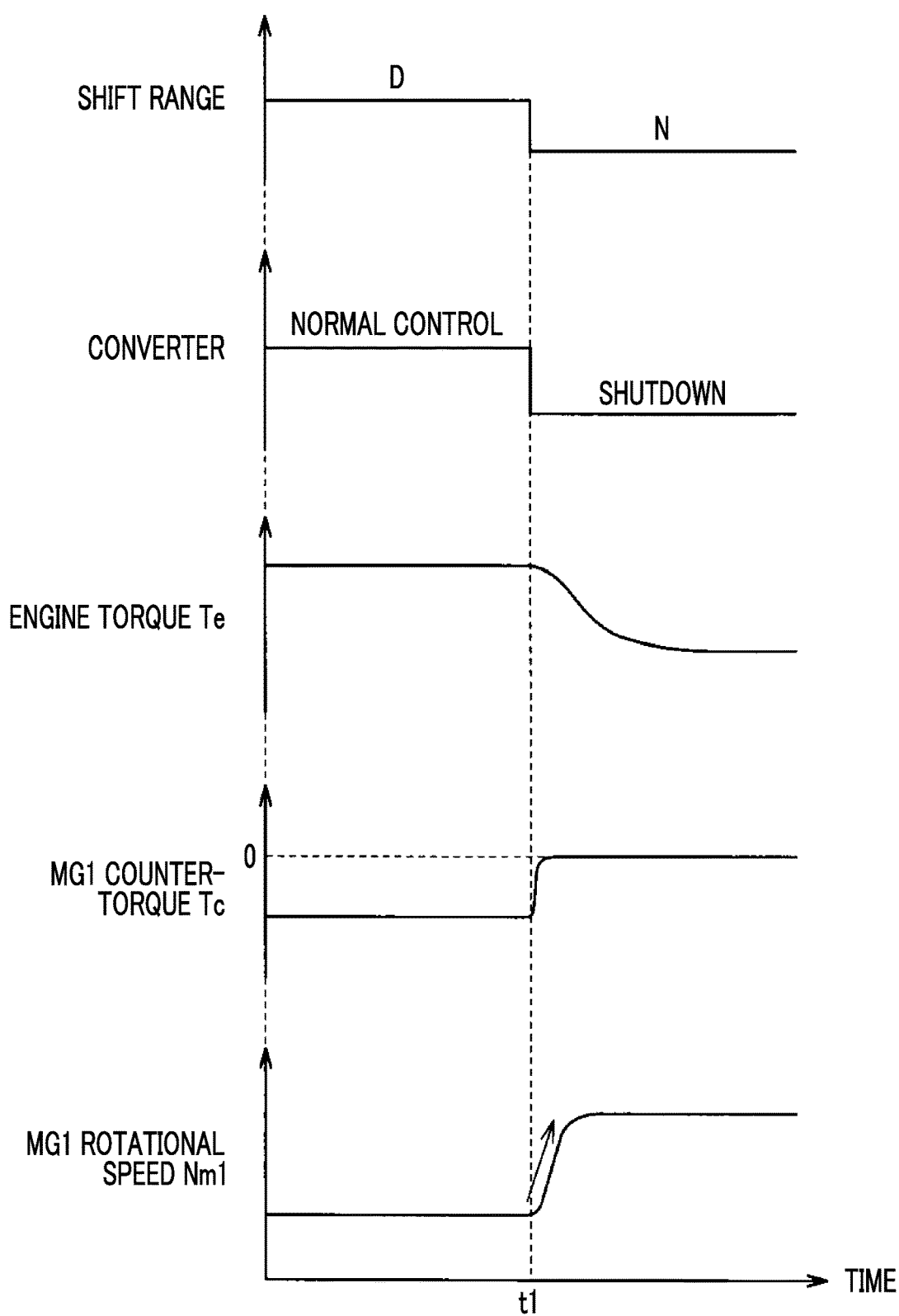
FIG. 7 is a time chart as a reference example describing a behavior and the like of the motor generator when a gate of a converter is immediately blocked in a case where a shift range is switched to a non-forward range from a forward range during the inverterless traveling control.

FIG. 7 is a time chart as a reference example describing the behavior and the like of the motor generator 10 when a gate of the converter 210 is immediately blocked in a case where the shift range is switched to a non-forward range from a forward range during the inverterless traveling control. In FIG. 7, a horizontal axis denotes an elapsed time period, and a vertical axis denotes, from the top, the shift range, operation of the converter 210, the engine torque Te, and the counter-torque Tc and the rotational speed Nm1 of the motor generator 10.

With reference to FIG. 7, inverterless traveling is executed before time t1. Before time t1, the shift range is selected to be D range, and the converter 210 performs a normal control. The normal control is a control for stepping up the voltage between the electric power lines PL, NL to or above the output voltage VB of the battery 150 by performing a switching operation of each of the switching elements Q1, Q2 in accordance with the control signal PWMC from the ECU 300. During inverterless traveling, decreasing the system voltage VH helps secure the counter-torque Tc. Accordingly, for example, the system voltage VH during inverterless traveling is preferably adjusted to a voltage V0 that is slightly higher than the output voltage (rated voltage) of the battery 150.

Before time t1, the engine torque Te for inverterless traveling is output from the engine 100, and the counter-torque Tc is generated in the motor generator 10 (MG1).

At time t1, for example, the shift range is switched to N range, which is a non-forward range, from D range while the vehicle 1 is temporarily stopped, and the converter 210 is immediately shut down (gate blocking state) in accordance with the switching of the shift range. When the converter 210 is shut down, the motor current IM1 that flows between the motor generator 10 and the battery 150 is blocked, and the counter-torque Tc of the motor generator 10 immediately becomes zero.

When the shift range is switched to N range from D range, the torque Te of the engine 100 is decreased. However, the torque responsiveness of the engine 100 is lower than the torque responsiveness of the motor generator 10. Thus, while the counter-torque Tc of the motor generator 10 immediately becomes zero in accordance with the shutdown of the converter 210, the torque Te of the engine 100 is not decreased yet, and the rotational speed Nm1 of the motor generator 10 is rapidly increased. Then, the counter-voltage Vc of the motor generator 10 is also rapidly increased along with the rapid increase in rotational speed Nm1, and an overvoltage of the system voltage VH may be caused.

Therefore, when the shift range is switched to a non-forward range from a forward range during the inverterless traveling control in the hybrid vehicle according to the first embodiment, the converter 210 is not immediately set to a gate blocking state, and the converter 210 is controlled to adjust the system voltage VH to the maximum voltage. For example, the maximum voltage is the maximum design value of the system voltage VH that may be adjusted by the converter 210. Accordingly, the rotational speed Nm1 of the motor generator 10 is restricted to a rotational speed level at which the counter-voltage Vc of the motor generator 10 becomes equal to the maximum voltage level of the system voltage VH. Consequently, an overvoltage of the system voltage VH is suppressed. When the rotational speed Nm1 is decreased after a decrease in the torque Te of the engine 100, the converter 210 is set to a gate blocking state.

Accordingly, when the shift range is switched to a non-forward range from a forward range during the inverterless traveling control, the hybrid vehicle according to the first embodiment can continue inverterless traveling and suppress an overvoltage of the system voltage VH. The system voltage VH immediately after the shift range is switched to a non-forward range from a forward range does not exactly need to be the maximum voltage and may be a voltage within a predetermined range from the maximum voltage.

Figure 8:
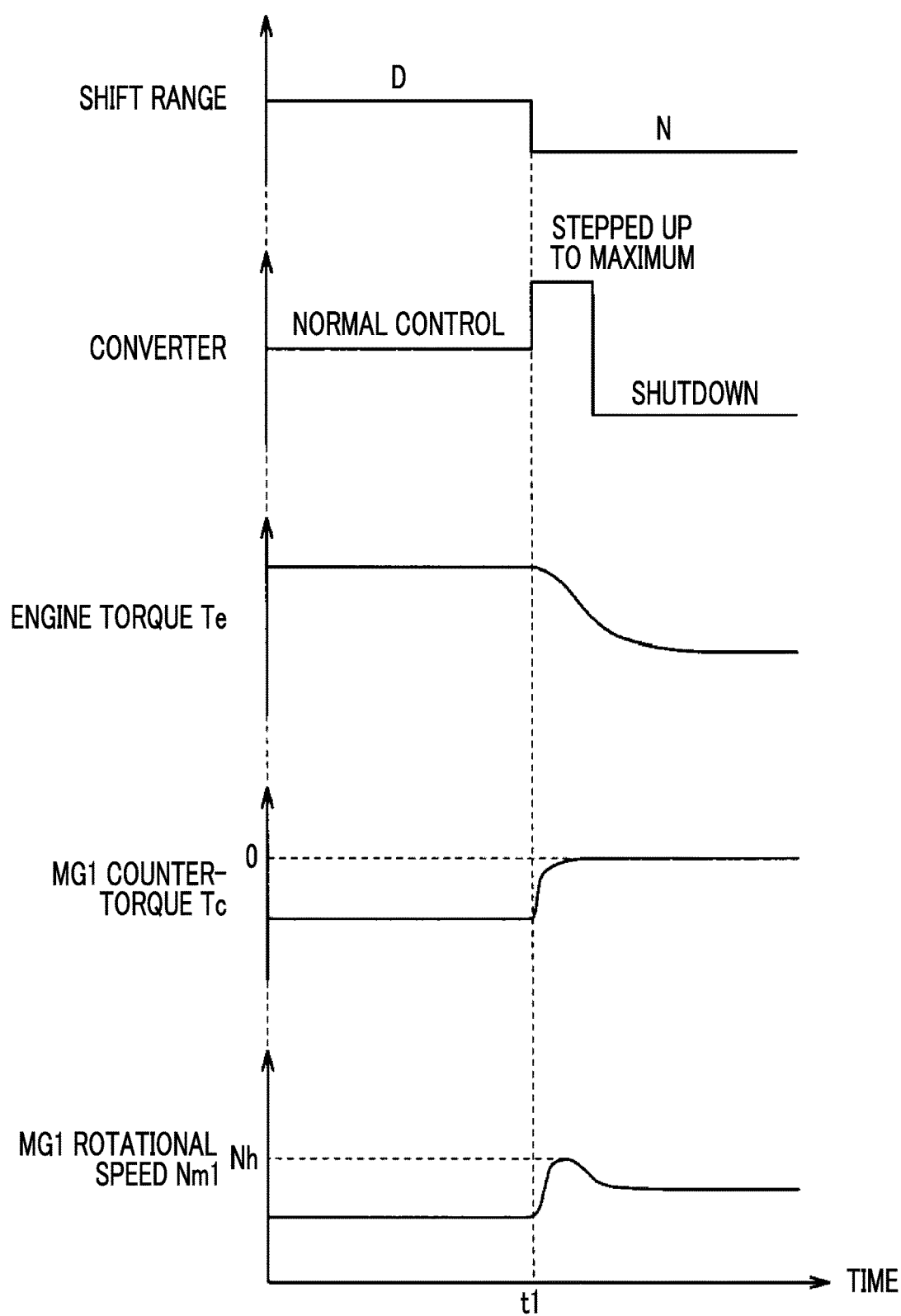
FIG. 8 is a time chart describing the behavior and the like of the motor generator when the shift range is switched to a non-forward range from a forward range during the inverterless traveling control in the first embodiment.

FIG. 8 is a time chart describing the behavior and the like of the motor generator 10 when the shift range is switched to a non-forward range from a forward range during the inverterless traveling control in the first embodiment. FIG. 8 corresponds to FIG. 7.

With reference to FIG. 8, inverterless traveling is executed before time t1 also in the example in FIG. 8. The situation before time t1 is the same as the situation in the reference example illustrated in FIG. 7.

At time t1, for example, when the shift range is switched to N range, which is a non-forward range, from D range while the vehicle 1 is temporarily stopped, the converter 210 is not immediately shut down as described above, and the system voltage VH is adjusted to the maximum voltage in the first embodiment. Accordingly, the rotational speed Nm1 of the motor generator 10 is restricted to the level of a rotational speed Nh at which the counter-voltage Vc of the motor generator 10 becomes equal to the maximum voltage level of the system voltage VH. The reason is because when the counter-voltage Vc exceeds the maximum voltage of the system voltage VH, a current flows to the battery 150 through the converter 210. Thus, a counter-torque is generated in the motor generator 10, and the rotational speed Nm1 is restricted.

When the rotational speed Nm1 of the motor generator 10 is decreased in accordance with a decrease in the torque Te and the rotational speed Ne of the engine 100, the converter 210 is shut down (gate blocking state) because the counter-voltage Vc is not rapidly increased even when the converter 210 is shut down (because the torque Te of the engine 100 is decreased).

Figure 9:
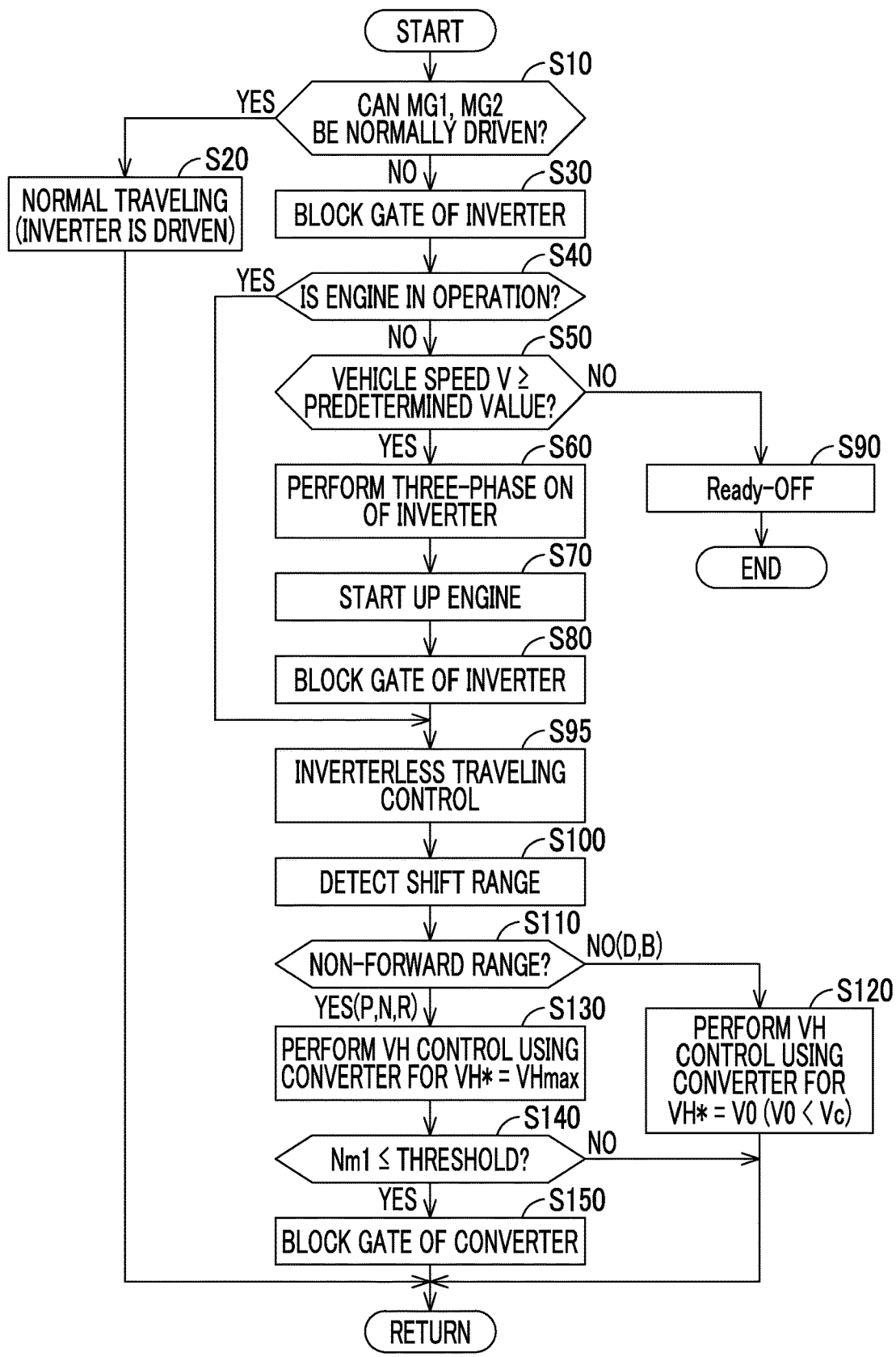
FIG. 9 is a flowchart for describing a traveling control in the hybrid vehicle according to the first embodiment.

FIG. 9 is a flowchart for describing a traveling control in the hybrid vehicle according to the first embodiment. The control process corresponding to the flowchart is repeatedly executed by the ECU 300.

With reference to FIG. 9, the ECU 300 determines whether or not the motor generators 10, 20 can be normally electrically driven using the inverters 221, 222 (step S10). When the motor generators 10, 20 can be normally driven (YES in S10), the ECU 300 causes the vehicle 1 to perform normal traveling by setting the control mode to the normal mode (step S20). Then, the ECU 300 transitions to the process of RETURN.

When the motor generators 10, 20 cannot be normally driven (NO in S10), the ECU 300 sets the inverters 221, 222 to a gate blocking state by outputting the gate blocking signals SDN1, SDN2 (step S30). Accordingly, the inverters 221, 222 can be protected.

The ECU 300 determines whether or not the engine 100 is in operation (step S40). When the engine 100 is already in operation (YES in step S40), the ECU 300 maintains the operation of the engine 100 and executes the inverterless traveling control (step S95).

Specifically, the converter 210 performs a PWM operation to maintain the current path CP in an electrical connection state (conduction state), and the motor current IM1 from the motor generator 10 may flow to the battery 150. The ECU 300 controls the engine 100 to adjust the rotational speed Ne, thereby maintaining the rotational speed Nm1 in a region where the counter-voltage Vc is higher than the system voltage VH (the region where the rotational speed Nm1 is higher than Nth in FIG. 5). Accordingly, the motor current IM1 continues flowing along the current path CP, and the counter-torque Tc and the drive torque Tep can be generated.

When the ECU 300 in step S40 determines that the engine 100 is stopped (NO in step S40), the ECU 300 determines whether or not a vehicle speed V is higher than or equal to a predetermined value (step S50). As will be described below, such a process is for determining whether or not the engine 100 can be cranked by a three-phase ON control of the inverter 221. The predetermined value of the vehicle speed V is a value that is set in advance as a threshold for determining whether or not the engine 100 can be cranked.

When the vehicle speed V is higher than or equal to the predetermined value, that is, when the vehicle 1 is performing EV traveling at the vehicle speed V higher than the predetermined value (YES in step S50), the ECU 300 executes the three-phase ON control of the inverter 221 to crank the engine 100 (step S60).

Figure 10:
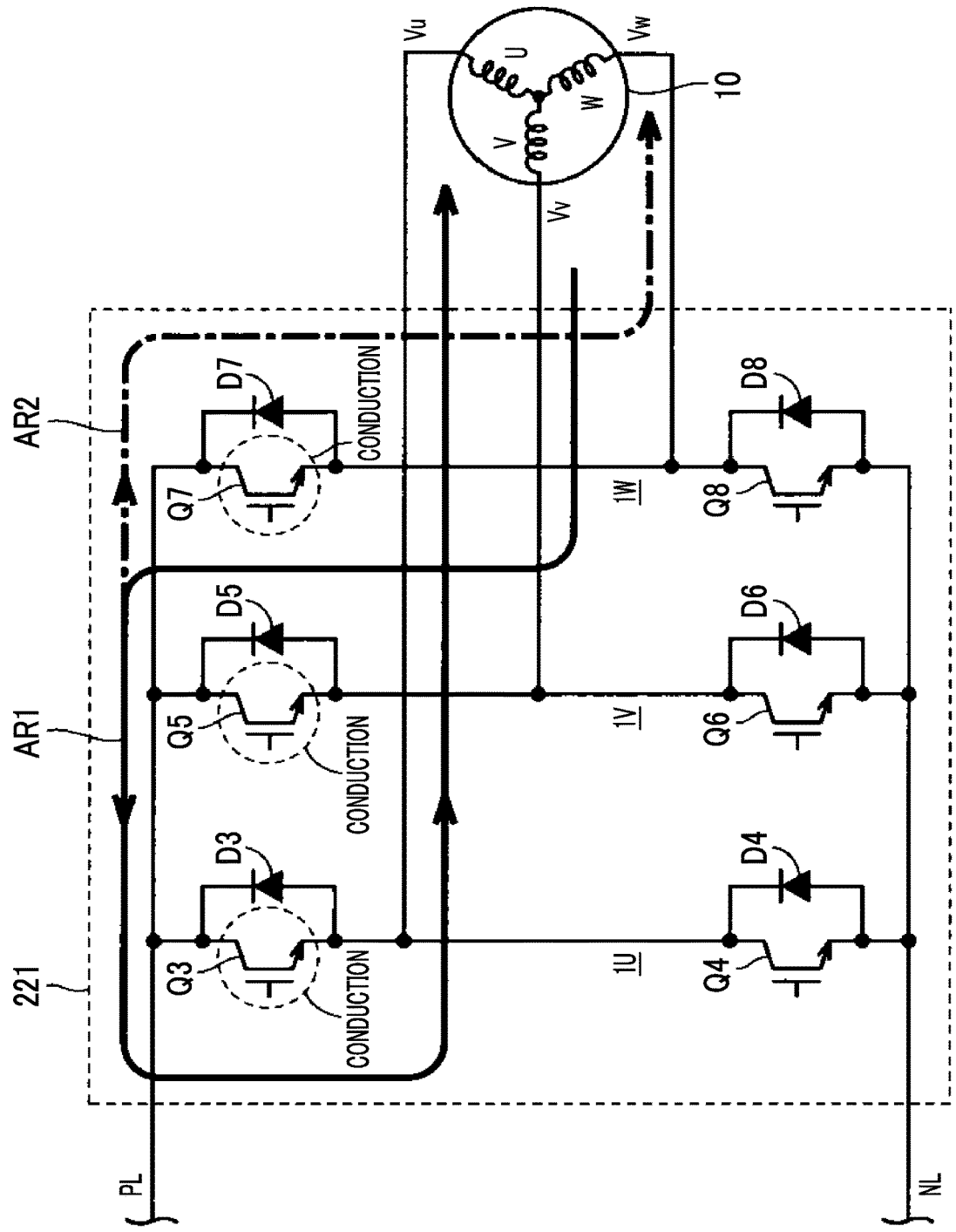
FIG. 10 is a diagram for describing a three-phase ON control of an inverter.

FIG. 10 is a diagram for describing the three-phase ON control of the inverter 221. With reference to FIG. 10, in the three-phase ON control, all switching elements Q3, Q5, Q7 constituting an upper arm of the inverter 221 are switched to a conduction state. Alternatively, although not illustrated, all switching elements Q4, Q6, Q8 constituting a lower arm may be switched to a conduction state. For example, when currents flow as illustrated by arrows AR1, AR2 by executing the three-phase ON control, a torque that is applied in a direction of impeding rotation of the motor generator 10 (drag torque) is generated in the motor generator 10. The engine 100 can be cranked using the drag torque.

With reference to FIG. 9 again, when the rotational speed Ne of the engine 100 reaches a reference value by cranking based on the three-phase ON control, the ECU 300 starts up the engine 100 by performing fuel injection and ignition (step S70). Then, the ECU 300 sets the inverter 221 to a gate blocking state again (step S80), and transitions to the process of step S95 to execute the inverterless traveling control.

The drag torque generated by the three-phase ON control is decreased as the rotational speed Nm1 of the motor generator 10 is decreased. For example, when the engine 100 is at a stoppage while the vehicle 1 is stopped (that is, when the rotational speed Nm2 of the motor generator 20 is equal to zero), the rotational speed Nm1 is also equal to zero from the relationship on the collinear diagram. Thus, even when the three-phase ON control is executed, currents do not flow, and the drag torque is not generated. Thus, the engine 100 cannot be cranked, and the engine 100 cannot be started up. Accordingly, when the vehicle speed V is lower than the predetermined value (NO in step S50), that is, while the vehicle 1 is stopped with the engine 100 stopped, or when the vehicle 1 is performing EV traveling at a low speed, the ECU 300 transitions the vehicle 1 to a state where traveling is disabled by stopping the electrical system of the vehicle 1 (Ready-OFF state) (step S90).

During execution of inverterless traveling, the ECU 300 detects the shift range corresponding to the shift position SFT based on the signal from the position sensor 510 (step S100). The ECU 300 determines whether or not the detected shift range is a non-forward range (step S110).

When the ECU 300 determines that the shift range is a forward range, that is, D range or B range (NO in step S110), the ECU 300 sets the target voltage VH* of the system voltage VH to the predetermined voltage V0, and controls the converter 210 to adjust the system voltage VH to the predetermined voltage V0 (step S120). The predetermined voltage V0 is a voltage that is lower than the counter-voltage Vc and higher than the output voltage VB of the battery 150. Accordingly, the state where the counter-torque Tc is generated is maintained, and the vehicle 1 can acquire drive power in the forward direction from the drive torque Tep that is a reaction force of the counter-torque Tc (inverterless traveling).

When the ECU 300 in step S110 determines that the shift range is a non-forward range, that is, P range, N range, or R range (YES in step S110), that is, when the shift range is switched to a non-forward range from a forward range, the ECU 300 sets the target voltage VH* of the system voltage VH to a maximum voltage VHmax (may be a voltage within the predetermined range from the maximum voltage), and controls the converter 210 to adjust the system voltage VH to the maximum voltage VHmax (step S130). Accordingly, an overvoltage of the system voltage VH can be suppressed.

The ECU 300 determines whether or not the rotational speed Nm1 of the motor generator 10 is decreased to or below a threshold (step S140). For example, the threshold can be set as a rotational speed at which a determination can be made that the torque Te of the engine 100 is decreased. When the ECU 300 determines that the rotational speed Nm1 is decreased to or below the threshold (YES in step S140), the ECU 300 sets the converter 210 to a gate blocking state (step S150). Accordingly, the motor current IM1 that flows along the current path CP between the motor generator 10 and the battery 150 is blocked.

When the ECU 300 in step S140 determines that the rotational speed Nm1 is higher than the threshold (NO in step S140), the ECU 300 transitions to the process of RETURN without executing the process of step S150.

As described heretofore, when the shift range is switched to a non-forward range from a forward range during inverterless traveling in the first embodiment, the converter 210 is not immediately set to a gate blocking state, and the converter 210 is controlled to adjust the system voltage VH to the maximum voltage VHmax (may be a voltage within the predetermined range from the maximum voltage). Accordingly, the rotational speed Nm1 of the motor generator 10 is restricted to a rotational speed level at which the counter-voltage Vc of the motor generator 10 becomes equal to the maximum voltage level. Consequently, an overvoltage of the system voltage VH is suppressed. When the rotational speed Nm1 is decreased after a decrease in the torque Te of the engine 100, the converter 210 is set to a gate blocking state. Accordingly, according to the first embodiment, when the shift range is switched to a non-forward range from a forward range during the inverterless traveling control, inverterless traveling can be continued, and an overvoltage of the system voltage VH can be suppressed.

Modification Example

In the first embodiment, when the shift range is switched to a non-forward range from a forward range during the inverterless traveling control, the system voltage VH is adjusted to the maximum voltage VHmax. Then, when the rotational speed Nm1 of the motor generator 10 is decreased to or below the threshold, the gate of the converter 210 is blocked. However, the condition for blocking the gate of the converter 210 is not limited thereto. For example, the gate of the converter 210 may be blocked when a predetermined time period elapses from the time of controlling the system voltage VH to be the maximum voltage VHmax after the shift range is switched to a non-forward range from a forward range. For example, the predetermined time period can be set as a time period in which a determination can be made that the torque Te of the engine 100 is decreased.

Figure 11:
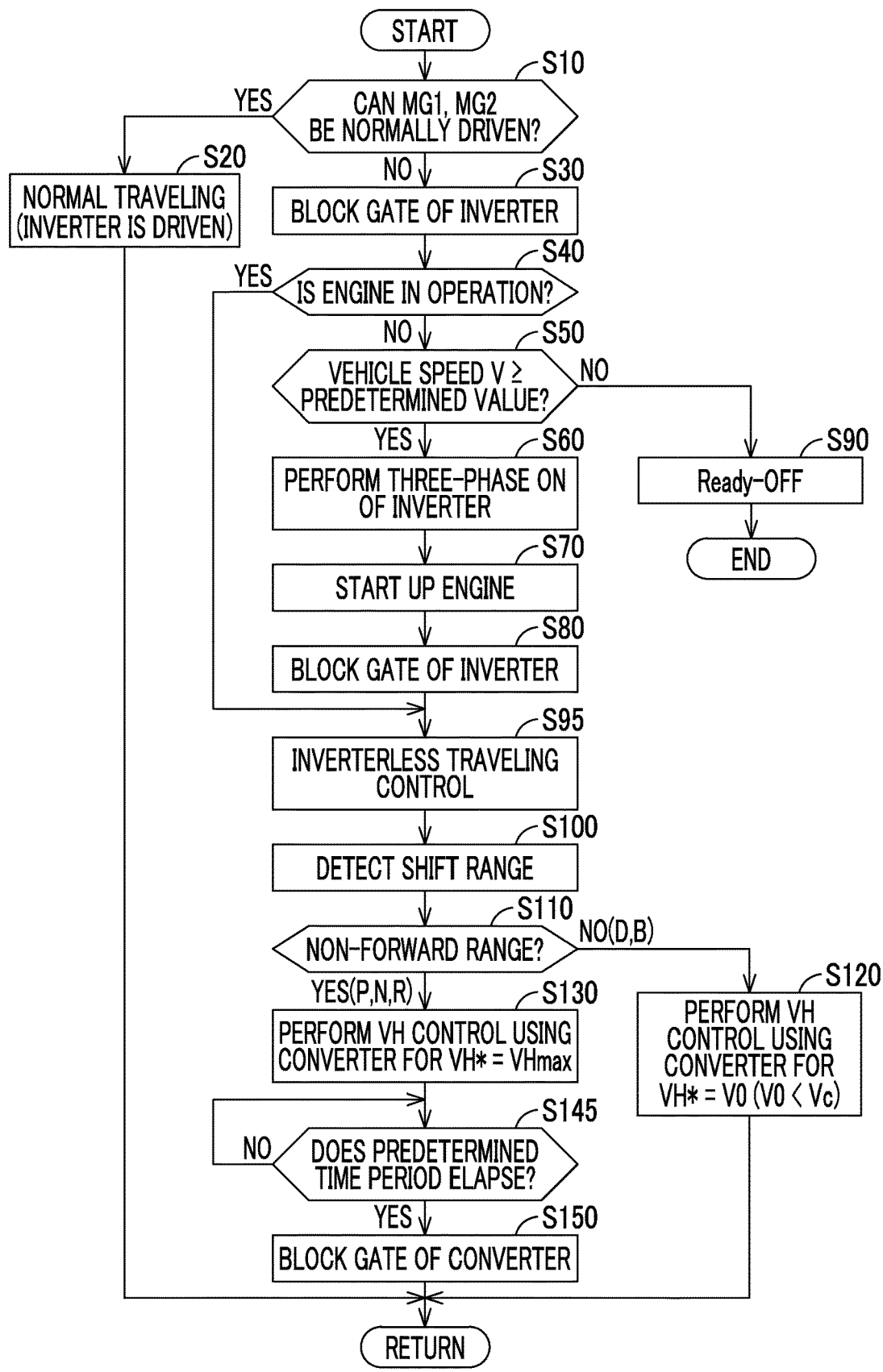
FIG. 11 is a flowchart for describing a traveling control in a hybrid vehicle of a modification example.

FIG. 11 is a flowchart for describing a traveling control in a hybrid vehicle of the modification example. The control process corresponding to the flowchart is repeatedly executed by the ECU 300.

With reference to FIG. 11, the flowchart includes step S145 instead of step S140 in the flowchart illustrated in FIG. 9. That is, when the shift range is switched to a non-forward range from a forward range (YES in step S110), and the system voltage VH is adjusted to the maximum voltage VHmax in step S130, the ECU 300 determines whether or not the predetermined time period elapses from the adjustment (step S145). When the ECU 300 determines that the predetermined time period elapses (YES in step S145), the ECU 300 transitions to the process of step S150 to block the gate of the converter 210.

The modification example achieves the same effect as the first embodiment. According to the modification example, a determination of the condition for blocking the gate of the converter 210 can be performed with a simple configuration without the need for acquiring the rotational speed Nm1 of the motor generator 10.

Second Embodiment

In the first embodiment and the modification example, when the shift range is a non-forward range during the inverterless traveling control, the motor current IM1 is blocked by setting the converter 210 to a gate blocking state. However, in a second embodiment, the motor current IM1 is blocked by opening the SMR 160.

An overall configuration of a hybrid vehicle and a configuration of an electrical system according to the second embodiment are equivalent to the overall configuration of the vehicle 1 (FIG. 1) and the configuration of the electrical system (FIG. 2) according to the first embodiment. Thus, descriptions of those configurations will not be repeated.

Figure 12:
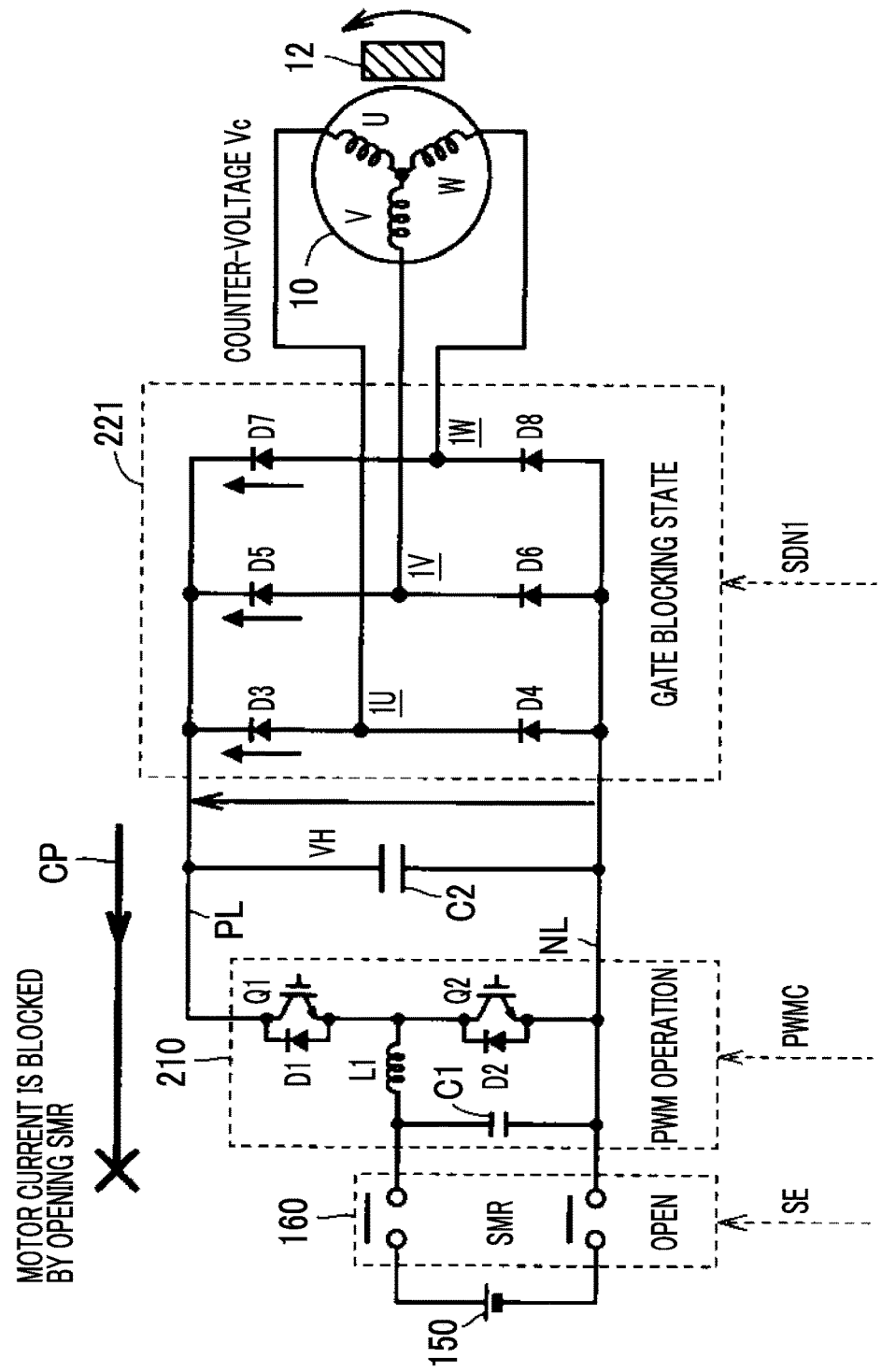
FIG. 12 is a diagram schematically illustrating a configuration of an electrical system when a current flowing along a current path is blocked during an inverterless traveling control in a second embodiment.

FIG. 12 is a diagram schematically illustrating a configuration of the electrical system when the motor current IM1 flowing along the current path CP is blocked during the inverterless traveling control in the second embodiment. With reference to FIG. 12, the motor current IM1 can be blocked by opening the SMR 160.

Even in the second embodiment, when the shift range is switched to a non-forward range from a forward range during inverterless traveling, the SMR 160 is not immediately opened, and the converter 210 is controlled to adjust the system voltage VH to the maximum voltage (may be a voltage within the predetermined range from the maximum voltage). When the rotational speed Nm1 is decreased after a decrease in the torque Te of the engine 100, the SMR 160 is opened. Even with such a configuration, when the shift range is switched to a non-forward range from a forward range during the inverterless traveling control, inverterless traveling can be continued, and an overvoltage of the system voltage VH can be suppressed.

Then, when the shift range is switched to a forward range from the non-forward range, inverterless traveling can be resumed by closing the SMR 160 to generate the counter-torque Tc and the drive torque Tep caused by the counter-torque Tc again.

Figure 13:
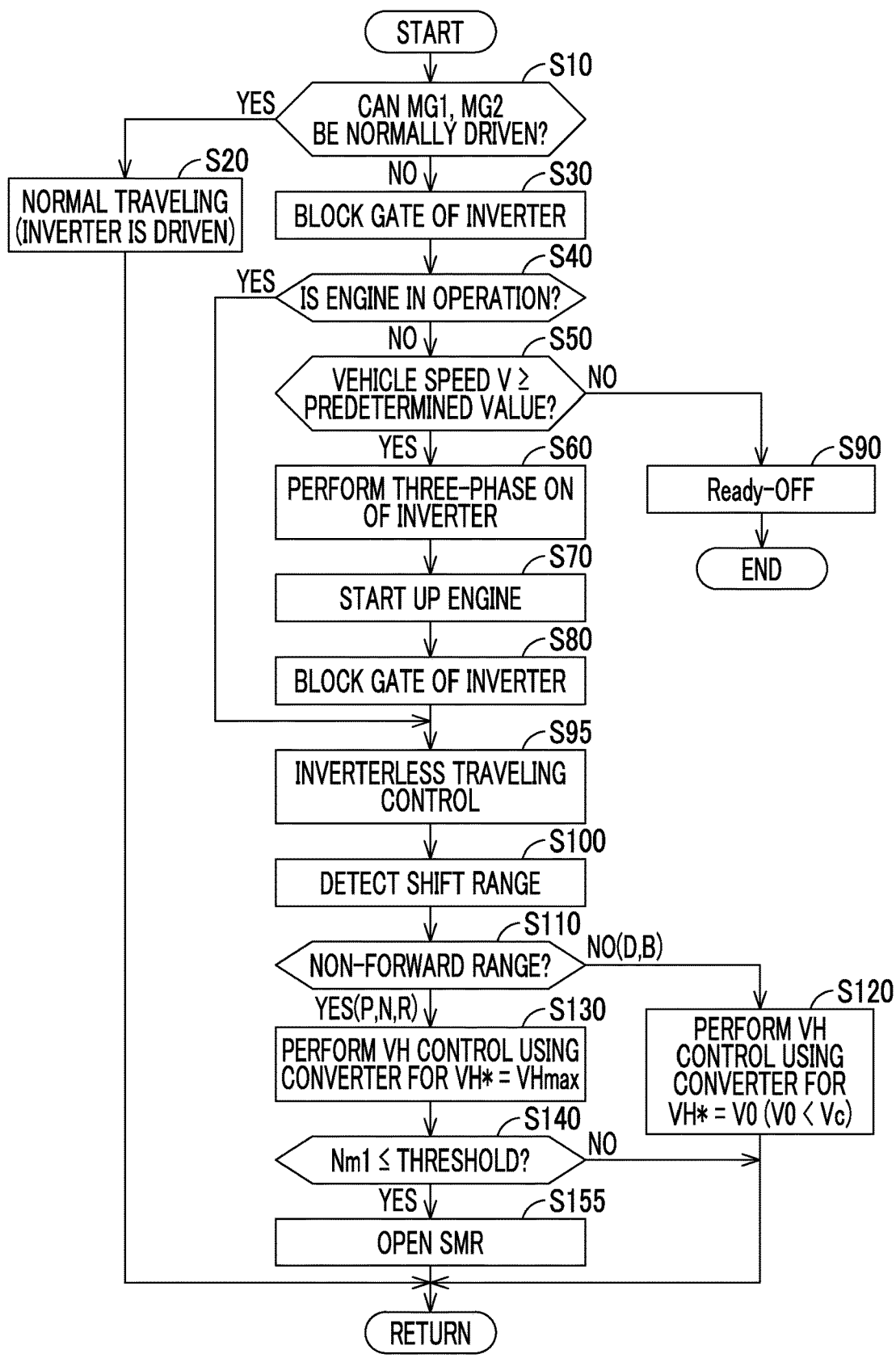
FIG. 13 is a flowchart for describing a traveling control in a hybrid vehicle according to the second embodiment.

FIG. 13 is a flowchart for describing a traveling control in the hybrid vehicle according to the second embodiment. The control process corresponding to the flowchart is repeatedly executed by the ECU 300.

With reference to FIG. 13, the flowchart includes step S155 instead of step S150 in the flowchart illustrated in FIG. 9. That is, when the shift range is switched to a non-forward range from a forward range (YES in step S110), the system voltage VH is adjusted to the maximum voltage VHmax (step S130). When the rotational speed Nm1 of the motor generator 10 is decreased to or below the threshold (YES in step S140), the ECU 300 opens the SMR 160 (step S155). Accordingly, the motor current IM1 that flows along the current path CP between the motor generator 10 and the battery 150 is blocked.

Although not illustrated in particular, the second embodiment may include step S145 illustrated in FIG. 11 instead of step S140 in the same manner as the modification example of the first embodiment. That is, when the shift range is switched to a non-forward range from a forward range, and the system voltage VH is adjusted to the maximum voltage VHmax, the ECU 300 determines whether or not the predetermined time period elapses from the adjustment. When the ECU 300 determines that the predetermined time period elapses, the ECU 300 transitions to the process of step S155 to open the SMR 160.

Figure 14:
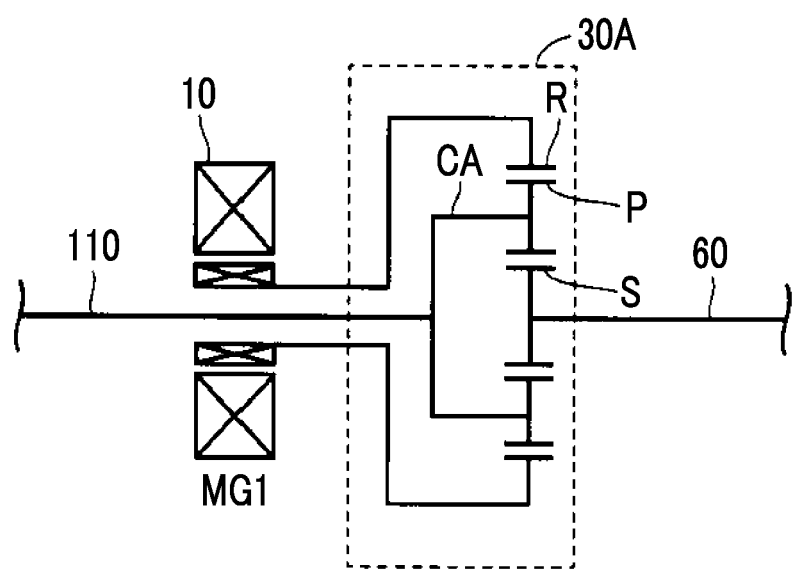
FIG. 14 is a diagram illustrating another configuration example of a planetary gear mechanism.

The second embodiment can achieve the same effect as the first embodiment. The first and second embodiments and the modification example describe an example in which the configuration of the planetary gear mechanism 30 includes the sun gear S connected to the rotor of the motor generator 10, the carrier CA connected to the crankshaft 110 of the engine 100, and the ring gear R connected to the output shaft 60. However, a "planetary gear mechanism" according to the present disclosure is not limited thereto, provided that the planetary gear mechanism is configured to apply a reaction force of the torque of the motor generator 10 to the output shaft. The "planetary gear mechanism" may be a planetary gear mechanism 30A illustrated in FIG. 14 instead of the planetary gear mechanism 30. For example, the planetary gear mechanism 30A is configured to include the sun gear S connected to the output shaft 60, the carrier CA connected to the crankshaft 110 of the engine 100, and the ring gear R connected to the rotor of the motor generator 10.

The embodiments disclosed herein are not to be considered restrictive and are illustrative from every point of view. The scope of the present disclosure is not disclosed by the descriptions of the embodiments and is disclosed by the claims, and includes all modifications made within the equivalent meaning and scope of the claims.

What is claimed is:

1. A hybrid vehicle comprising:
   an engine;
   a rotating electric device that includes a rotor in which a permanent magnet is disposed;
   an output shaft that is connected to drive wheels of the hybrid vehicle;
   a planetary gear mechanism that mechanically connects the engine, the rotor of the rotating electric device, and the output shaft to each other, the planetary gear mechanism being configured to transmit a torque among the rotating electric device, the engine, and the output shaft;

an electric power storage device configured to be recharged;

a converter that is disposed between the electric power storage device and an electric power line, the converter being configured to adjust a voltage of the electric power line to or above a voltage of the electric power storage device;

an inverter that is connected between the electric power line and the rotating electric device, the inverter being configured to convert electric power between the electric power line and the rotating electric device; and an electronic control unit configured to control the engine and the inverter to execute inverterless traveling, the inverterless traveling being a traveling state where the inverter is set to a gate blocking state, and where a reaction force of a torque that is output by the rotating electric device when the rotating electric device to be rotated by output of the engine generates electric power is applied to the output shaft, and control the converter to adjust the voltage of the electric power line to a predetermined maximum voltage or a voltage within a predetermined range from the maximum voltage when a shift range of the hybrid vehicle is switched to a non-forward range from a forward range during the inverterless traveling.

2. The hybrid vehicle according to claim 1, wherein the electronic control unit is configured to control the converter to be in the gate blocking state when a rotational speed of the rotating electric device is decreased below a predetermined rotational speed after the voltage of the electric power line is adjusted to the maximum voltage or the voltage within the predetermined range from the maximum voltage.

3. The hybrid vehicle according to claim 1, wherein the electronic control unit is configured to control the converter to be in the gate blocking state when a predetermined time period elapses after the voltage of the electric power line is adjusted to the maximum voltage or the voltage within the predetermined range from the maximum voltage.

4. The hybrid vehicle according to claim 1, further comprising a relay that is disposed between the electric power storage device and the converter, wherein the electronic control unit is configured to control the relay to be in an open state when a rotational speed of the rotating electric device is decreased below a predetermined rotational speed after the voltage of the electric power line is adjusted to the maximum voltage or the voltage within the predetermined range from the maximum voltage.

5. The hybrid vehicle according to claim 1, further comprising a relay that is disposed between the electric power storage device and the converter, wherein the electronic control unit is configured to control the relay to be in an open state when a predetermined time period elapses after the voltage of the electric power line is adjusted to the maximum voltage or the voltage within the predetermined range from the maximum voltage.

6. A method of controlling a hybrid vehicle including an engine, a rotating electric device, an output shaft, a planetary gear mechanism, an electric power storage device, a converter, an inverter, and an electronic control unit, the rotating electric device including a rotor in which a permanent magnet is disposed, the output shaft being connected to drive wheels of the hybrid vehicle, the planetary gear mechanism mechanically connecting the engine, the rotor of the rotating electric device, and the output shaft to each other, the planetary gear mechanism being configured to transmit a torque among the rotating electric device, the engine, and the output shaft, the electric power storage device being configured to be recharged, the converter being disposed between the electric power storage device and an electric power line, the converter being configured to adjust a voltage of the electric power line to or above a voltage of the electric power storage device, the inverter being connected between the electric power line and the rotating electric device, the inverter being configured to convert electric power between the electric power line and the rotating electric device, the electronic control unit being configured to control the engine, the converter, and the inverter, the method comprising:

executing inverterless traveling by the electronic control unit, the inverterless traveling being a traveling state where the inverter is set to a gate blocking state, and where a reaction force of a torque that is output by the rotating electric device when the rotating electric device to be rotated by output of the engine generates electric power is applied to the output shaft; and adjusting, by the electronic control unit, the voltage of the electric power line to a predetermined maximum voltage or a voltage within a predetermined range from the maximum voltage when a shift range of the hybrid vehicle is switched to a non-forward range from a forward range during execution of the inverterless traveling.

* * * * *